Figure 1:
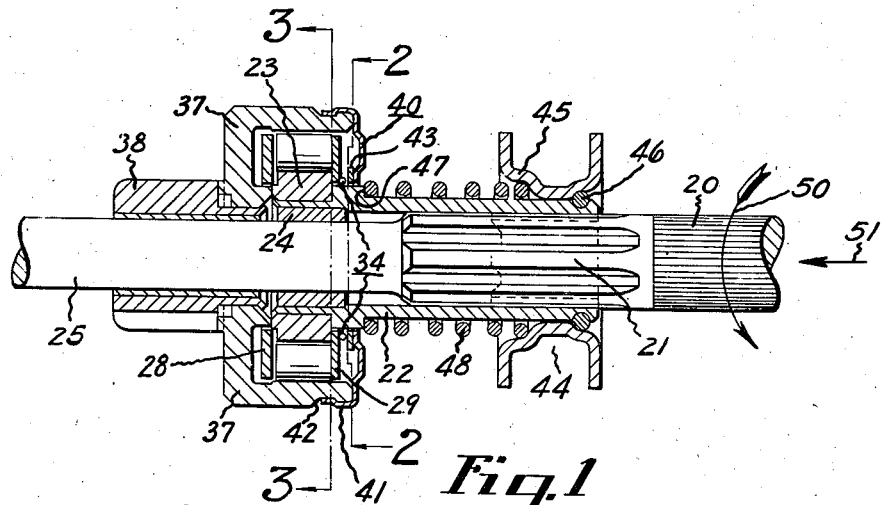

July 30, 1940.   R. H. HILL   2,209,459
OVERRUNNING CLUTCH
Filed March 3, 1938

INVENTOR
Robert H. Hill
BY
Spencer Hardman & Fehr
his ATTORNEYs

Patented July 30, 1940

2,209,459

UNITED STATES PATENT OFFICE 2,209,459

OVERRUNNING CLUTCH

Robert H. Hill, Anderson, Ind., assignor to General Motors Corporation, Detroit, Mich., a corporation of Delaware Application March 3, 1938, Serial No. 193,623

3 Claims. (Cl. 192—42)

This invention relates to overrunning clutches and more particularly to overrunning clutches used in starter drivers of electrical starting apparatus for internal combustion engines. The type of starter drives to which the present invention relates is one in which there is a unitary structure comprising an overrunning or one-way roller clutch connected with the starting motor armature shaft by longitudinal splines and having a pinion attached to the driven member of the clutch and slidably longitudinally into mesh with the flywheel gear of the engine to be started. This unitary structure is moved along the armature shaft of the motor by a foot-operated shifting device in order to mesh the pinion with the engine flywheel gear. This shifting device also controls the starting motor switch. The shifting device is spring returned to normal position thus demeshing the pinion from the engine after it has been started. The overrunning clutch is intended to prevent driving the starting motor by the engine in high speed when the engine becomes self-operative and before the pinion demeshing spring has been released. It occasionally happens that the overrunning clutch does not overrun with the result that the motor armature is driven with excessive speed by the engine and the windings and commutator segments of the armature are dislodged by centrifugal force.

It is the main object of the present invention to provide an overrunning clutch which can be depended upon to overrun at all times. In the conventional form of overrunning clutch used with engine starting devices, the rollers of the clutch are spring urged into wedging relation between the surfaces provided by an inner driving member or clutch cam and the cylindrical interior surface of a clutch shell or driven member. In other words, the rollers are always urged into a driving relation. Dependence is placed entirely upon the driving of the shell by the engine at a greater speed than the clutch cam can be driven by the motor in order to cause the rollers to be moved out of the wedged engagement between the clutch members. Occasionally the rollers do not move out of wedging engagement. This may be due to friction arising from grit getting into the clutch and preventing the rollers from being released from driving connection between clutch members. In order to overcome this difficulty I provide a clutch in which the rollers are not normally in driving relation with respect to the inner clutch cam and the outer clutch shell. Instead of the spring urging the rollers into driving relation as in the conventional clutch I provide an exactly opposite relation. I provide for the spring urging the rollers into non-driving relation so that the rollers are not normally set for driving the clutch shell in either direction with respect to the clutch cam. In order to bring the roller into driving relation with respect to the cam and shell, I depend on inertia of the clutch rollers and of a relatively heavy roller cage which holds the rollers in spaced relation. I am able to take advantage of this inertia effect owing particularly to the fact that the electric motor which is employed to start the engine is a series electric motor and, therefore, is one which very quickly accelerates on no load. Due to the fact that the clutch cam is very rapidly started into rotation and that the rollers and cage are relatively heavy and lag behind due to inertia, I am able to effect a driving relation between the cam rollers and shell even in opposition to the spring means which tends to move the rollers at all times into a non-driving relation between the cam and shell.

Further objects and advantages of the present invention will be apparent from the following description, reference being had to the accompanying drawing wherein a preferred embodiment of the present invention is clearly shown.

Figure 2:
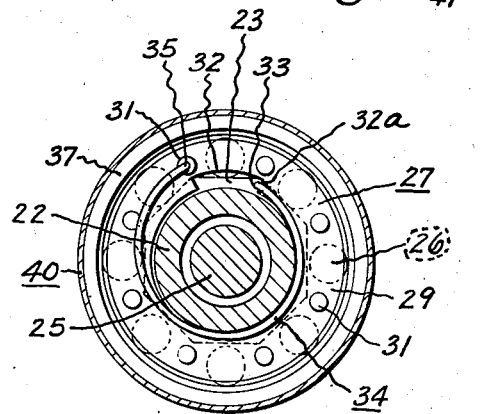
Figure 3:
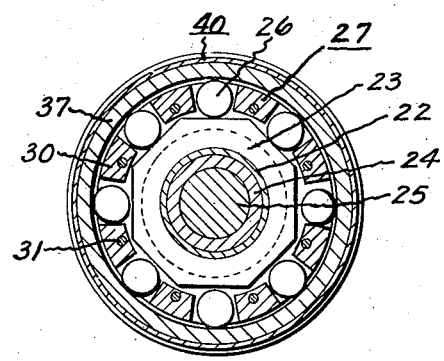
Figure 4:
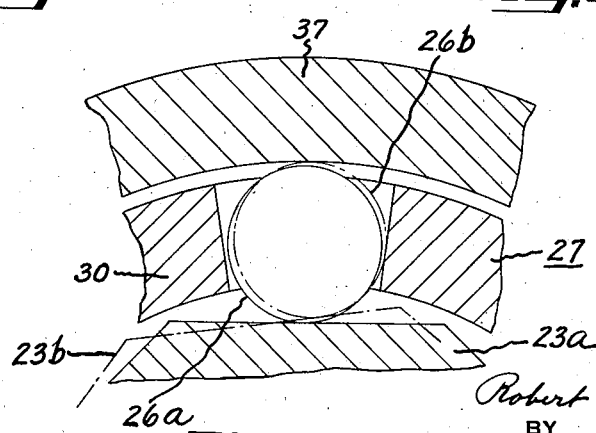

In the drawing:

Figure 1 is a longitudinal section of an engine starter drive embodying the present invention;

Figures 2 and 3 are sectional views taken respectively on the lines 2—2 and 3—3 of Figure 1; and Figure 4 is a fragmentary, sectional view of the overrunning clutch and is drawn on a larger scale in order to illustrate its operation.

Referring to the drawing, a starter motor armature shaft 20 is provided with splines 21 by which the shaft is drivingly connected with a sleeve 22 to which the clutch driving members or cam 23 is attached. Sleeve 22 provides a bearing bushing 24 which slides along a plain portion 25 of shaft 20. The cam 23 is equilateral, there being eight equal sides in the particular cam illustrated. Each cam side cooperates with a roller 26 pocketed in a roller cage 27. The cage 27 is fabricated from side rings 28 and 29 which are held in a fixed spaced relation by blocks 30, which in turn hold the rollers 26 in a definite spaced relation. The side rings and the blocks are secured together by rivets 31. As shown in Figure 2, the ring 29 is provided with a notch 32 into which extends the end 33 of a single turn spring 34. The spring-end 33 extends into a hole in the cam 23. The other end 35 of the spring extends into a hole drilled into one of the rivets 31. The spring-ends 33 and 35 are biased away from each other; therefore, the spring tends to urge the cam 23 clockwise and the ring 29 counterclockwise. The parts are held normally in the position shown in Figure 2, the right-hand edge 32a of the notch 32 bearing against the spring end 33. In this position of the roller cage 27, the rollers 26 are held normally in non-driving relation with respect to the inner clutch member or cam 23 and the outer clutch member or driven shell 37 to which the starting motor pinion 38 is connected. The clutch parts are held in assembled relation by a retainer disc 40 having a flange 41 which is spun into a groove 42 in the clutch shell 37. A washer 43 is located between the retainer plate 40 and the spring 34.

The assembly of the overrunning clutch and pinion is moved along the shaft 20 by suitable shifting lever, not shown, having studs received in the groove 44 provided by a flanged shifting collar 45 retained on the sleeve 22 by wire split ring 46 which is received by a groove in the end of the sleeve 22. Between the collar 45 and a shoulder 47 provided by the sleeve 22 there is located a compression spring 48 which transmits movement from the collar 45 to the sleeve 22 in a direction to move the pinion 38 into mesh with the flywheel gear of the engine to be started. The function of the spring 48 is to permit the closing of the starting motor switch by the shifting lever in case the ends of the pinion teeth abut the end of the engine flywheel gear teeth.

The clutch which I have illustrated is arranged to be used with a starting motor which drives its armature shaft 20 counterclockwise or in the direction of arrow 50 when looking in the direction of arrow 51 in Figure 1. The operation of the clutch is best understood by reference to Figure 4, in which the clutch members are shown on an enlarged scale. Normally the roller 26 is in non-driving relation with respect to cam 23 and shell 37. This position of the roller 26 is indicated by the solid line circle 26a. It will be noted in Figure 4, that roller 26 does not touch the shell 37, but it merely rests on the cam 23. This is true with respect to the three upper rollers shown in Figure 3. The opposite is true with respect to the three lower rollers which rest upon the shell and are out of engagement with the cam. The two other rollers which are midway between the three upper ones and the three lower ones gravitate upon the blocks 30 of the cage 27. At any rate all of the rollers 26 are normally in non-driving relation with respect to the cam and shell of the clutch. They are all urged into the non-driving relation by a movement of the cage which is produced by the spring 34.

The starting motor which drives the shaft 20 is a series electric motor. During the brief interval of time before the clutch picks up its load there is practically no load on the motor; hence, the shaft 20 accelerates very rapidly from rest, driving with it the cam 23 which rotates from the full line position 23a in Figure 4 to the dot-dash-line position 23b, while the other parts of the clutch tend to remain stationary due to their inertia. By making the clutch cage 27 as massive as the space will permit, I am able to take advantage of the inertia and the lagging behind of the clutch, cage and rollers as the inner clutch cam 23 accelerates. Due to the fact that the cage and rollers lag behind while the cam accelerates each roller is moved into a driving relation with respect to the cam and shell, its driving position being indicated by the dot-dash-line circle 26b in Figure 4. As soon as the engine becomes self operative and it tends to drive the clutch shell 37 at a rate faster than the motor tends to drive the clutch cam, the rollers 26 will be released from wedging position and they will tend naturally to move into non-wedging position; and this natural tendency will be aided by the spring 34 which is biased to move the cage 27 in a direction to move the rollers into non-wedging relation with respect to the cam and shell.

From the foregoing description of the construction and mode of operation of the clutch embodied in the present invention it is apparent that the clutch comprises a driving cam, wedging rollers and a driven clutch member providing a cylindrical surface, each of the rollers being capable of wedging relation with respect to a surface of a cam and the cylindrical surface of the clutch driven member. Spring means are employed to urge the rollers normally into non-wedging relation with respect to the clutch cam and clutch driven member. The spring means acts upon the rollers through a cage which is massive in construction so that it presents appreciable inertia thereby causing the clutch rollers and cage to lag behind the clutch cam when it accelerates from rest. Due to the lagging behind of the clutch, rollers and cage, the clutch cam, by driving ahead, wedges the rollers into driving relation with respect to the cam and the clutch driven member. When the engine becomes self operative and tends to drive the clutch driven member ahead of the clutch driving member the clutch rollers move into non-driving relation, this relation being aided by the spring which is biased to normally hold the rollers in the non-driving relation.

While the embodiment of the present invention as herein disclosed, constitutes a preferred form, it is to be understood that other forms might be adopted, all coming within the scope of the claims which follow.

What is claimed is as follows:

1. An overrunning clutch for engine starter drives comprising a driving member or cam operated by the shaft of a series electric motor, said cam having a plurality of wedging surfaces, a driven member having a cylindrical surface, a plurality of rollers, one for each cam surface, located between the cam and cylindrical surface of the driven member and adapted to be wedged by a movement of the cam relative to the rollers into driving relation to the cam and driven member, and a cage between the cam and driven member for locating the rollers in spaced relation, and a coil spring connecting the cam and cage for urging the rollers normally into non-driving relation with respect to the cam and driven member, that portion of spring connected with the cam bearing against a portion of the cage to serve as a stop limiting the position of the cage to one in which the rollers are normally located in non-driving relation with respect to the cam and driven member.

2. An overrunning clutch for engine starter drives comprising a driving member having a cam with a plurality of wedging surfaces, a driven member having a cylindrical surface, a plurality of rollers, one for each cam surface, located between the cam and cylindrical surface of the driven member and adapted to be wedged by movement of the driving member relative to the rollers into driving relation with the cam and driven member, and a cage between the cam and driven member for locating the rollers in spaced relation, said cage and rollers being oscillatable relative to the cam, means limiting the range of cage oscillations and providing a positive stop at one end of the range in which the rollers are in non-wedging relation, and means yieldably holding the cage against said stop, yet permitting angular movement of the cam relative to the cage for effecting a wedged relation between the cam and driven member upon initial operation of the driving member, said yieldable means operating upon acceleration of the driven member in advance of the speed of the driving member, to restore the non-wedging relation of the rollers.

3. An overrunning clutch for engine starter drives comprising a driving member having a cam with a plurality of wedging surfaces, a driven member having a cylindrical surface, a plurality of rollers, one for each cam surface, located between the cam and cylindrical surface of the driven member and adapted to be wedged by movement of the cam relative to the rollers into driving relation with the cam and driven member, and a cage between the cam and driven member for locating the rollers in spaced relation, means providing limited angular movement between the cam and cage, one limit of said movement incorporating positive stop means for the non-wedging relation of said rollers, and spring means biasing the cage and cam against their respective stops, whereby the rollers are normally free of the wedging relation, said cage having a substantial mass such that cage and rollers lag behind the cam as the cam is accelerated from rest, whereby, due to the inertia of the cage and rollers, relative movement between the cam and rollers is obtained sufficient to cause the rollers to be drivingly wedged between the cam and driven member.

ROBERT H. HILL.